(No Model.) 3 Sheets—Sheet 2.

L. H. NASH.
PROPORTIONAL WATER METER.

No. 353,701. Patented Dec. 7, 1886.

Witnesses:
R. E. Trautz
Daniel Scott

Inventor:
Lewis H. Nash
by Johnson and Johnson
Attys (No Model.) 3 Sheets—Sheet 3.
L. H. NASH.
PROPORTIONAL WATER METER.
No. 353,701. Patented Dec. 7, 1886.
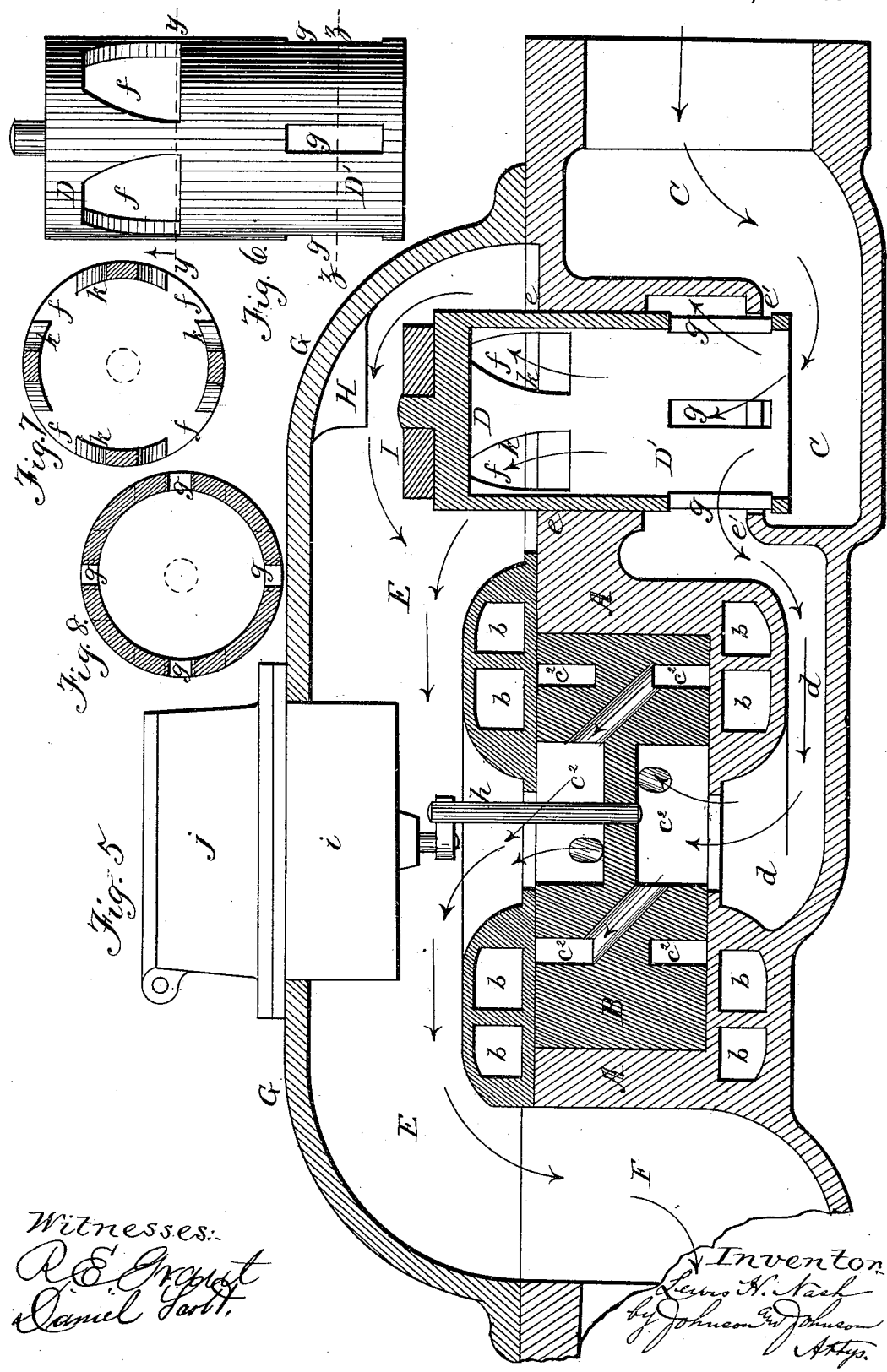
Witnesses:
Inventor
Lewis H. Nash
by Johnson and Johnson
Attys.

UNITED STATES PATENT OFFICE.

LEWIS HALLOCK NASH, OF BROOKLYN, ASSIGNOR TO THE NATIONAL METER COMPANY, OF NEW YORK, N. Y.

PROPORTIONAL WATER-METER.

SPECIFICATION forming part of Letters Patent No. 353,701, dated December 7, 1886.

Application filed January 16, 1886. Serial No. 188,773. (No model.)

*To all whom it may concern:*

Be it known that I, LEWIS HALLOCK NASH, a citizen of the United States, residing at Brooklyn, in the county of Kings and State of New York, have invented new and useful Improvements in Proportional Water-Meters, of which the following is a specification.

For measuring a volume of water flowing through a meter device in divided streams I have devised an automatic flow-controlling cylindrical valve of coacting plunger parts having a weight determined by the resistance which it is desired to offer to the flow of the water, and having ports formed to vary the proportional area of the discharge-orifices for every rate of flow. This provision for varying the area of the discharge-ports is preferably in the plunger-valve which controls the non-measured stream, and these ports have greater capacity than the ports for controlling the measured stream. The coacting valves are connected for simultaneous movements, are hollow and cylindrical, and preferably of diameters proportioned to the quantity of water which must pass in each stream, and the form and capacity of the ports in the cylinders and the weight of the coacting valves are such that for any given rate of flow through the meter the coacting valves will be held in a definite position, and will open the ports for each stream the proper area to pass the required proportion of the flowing volume. The coacting valves are placed vertically at the inlet end of the meter in bearings which offer little friction, and their ports are controlled by the edges of the casings which form these bearings, the valve-ports being closed when they sink below these bearing-edges, and they are opened as the coacting valves are lifted by the pressure of the water against their closed upper end, the ascent being limited by a stop, so that they cannot be displaced from their separate bearings.

Figure 1:
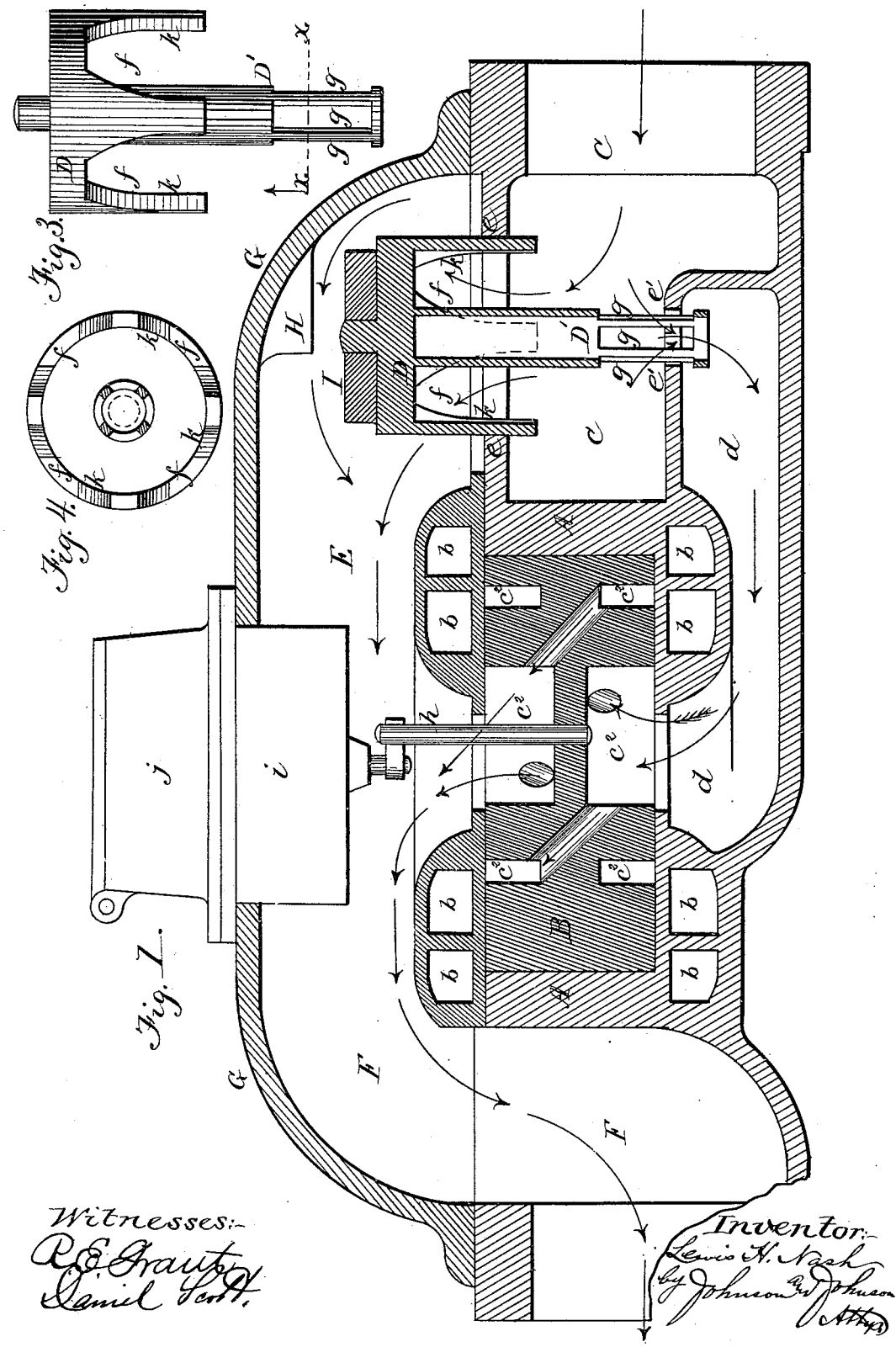
Figure 2:
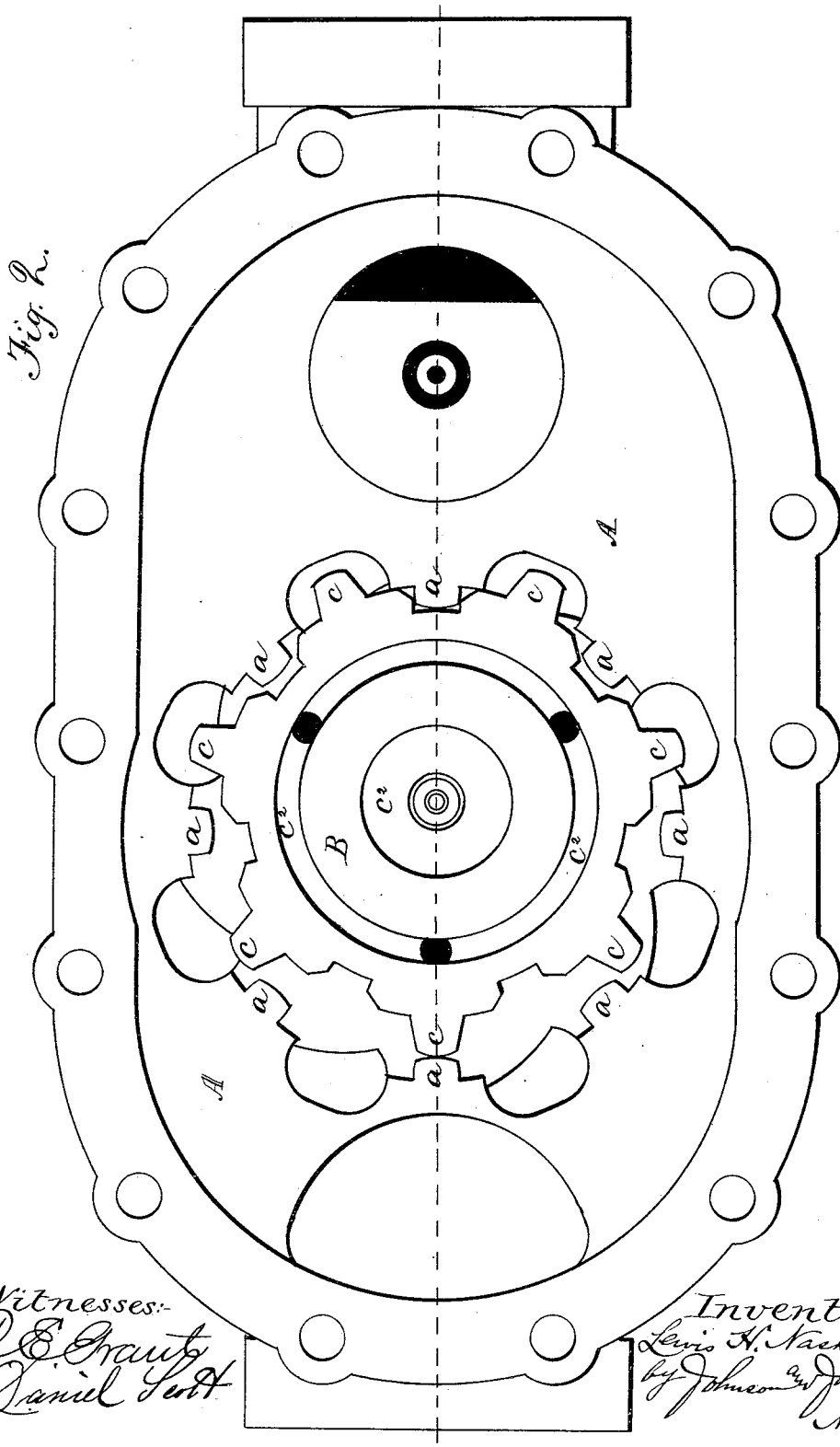

Referring to the drawings, in Figure 1 I have shown in vertical section a water-meter having my improved proportional flow-controlling valve. Fig. 2 shows a top view with the case-cover and valve removed to show the form of the rotating piston which I prefer to use. Fig. 3 shows the coacting plunger-valves in elevation; Fig. 4, a cross-section of the valve on the line $x\ x$. Fig. 5 represents the meter having a modified form of valve. Fig. 6 shows the modified form of the coacting valves in elevation; and Figs. 7 and 8 are cross-sections of this valve taken, respectively, on the lines $y\ y$ and $z\ z$.

For the meter-operating part I prefer to use what is known in the trade as the "Crown" meter, in which the case A is formed with interior wall projections, $a$, and top and bottom head-ports, $b$, with which a piston, B, having projections $c$ and valve-ports $c^2$, co-operates to divide the case-chamber into receiving and discharging measuring-spaces by its epicycloidal movement about the center of said case, and thus control the inlet and discharge of the water. The piston connects by a crank-spindle, $h$, with gearing contained in the box $i$, which gearing operates the indicating mechanism contained in the box $j$. In this construction the piston-ports $c^2$ are made concentric and co-operate with the case head-ports $b$, to effect the division stated; but as such construction constitutes the subject-matter of patents granted to me January 21 and 28, 1879, a full and particular description thereof is deemed unnecessary, as my improved flow-controlling coacting valves are not confined to the particular piston-operating parts.

In Fig. 1, C is the inflow-passage, where the volume is divided into two streams by my improved plunger coacting valves, and F is the outlet-passage for both streams. The inflow is controlled by connected cylindrical plunger coacting valves fitted in the case-bearings $e$ $e'$, so as to operate vertically two sets of ports formed in the valve-walls. The valve is weighted, and has two sets of ports—one set, $f$, at its top, and the other set, $g$, at its bottom, the top ports, $f$, opening into the main discharge-passage E in the case above the meter-piston, and the bottom ports, $g$, opening into the meter-passage $d$ below the piston. The valve is a hollow cylindrical plunger closed at its top and open at its bottom, and I prefer to make it of two different diameters, so as to form a valve at each end, the largest one, D, being at its top, and having ports $f$ of irregular form in its vertical walls, while the lower smaller valve, D', has ports $g$ of regular form in its vertical walls. When there is a pressure in the passage C, it will lift the coacting valves by acting upon their upper closed end, D, which has the greatest area of surface subjected to pressure. The inlet-passage C extends around the plunger-valve, and the latter has a seat, e, at its top in the case-wall, and a seat, e', at its bottom in the case-wall, and these seats co-operate with the valve-ports f and g to close the said ports in the lowest position of the valve, in which case the upper closed end of the valve will sink below the upper wall-seat, e, and the upper ends of the lower ports will sink below the wall-seat e'.

The cylinder of the top valve has its walls cut away to form ports f of irregular or curved outline, so that the area of said ports diminishes as they approach the closed end, and this outline is formed and determined by tests, by enlarging or contracting the edges k until the opening is the required size to pass the right proportional quantity of water. The cylinder of the bottom valve has ports g of rectangular oblong form, so that they will aways open an area proportional to the lift of the valve. Both these valve-ports open into the inlet-passage C all around the coacting valves, and when the latter are open one stream passes down downward through the small cylinder-ports, and the other stream passes upward through the large cylinder-ports.

The weight I of the coacting valves determines the pressure of the water as it issues through the valve-orifices, and such weight may be regulated to suit the delivery of the meter; hence if the meter is delivering a certain quantity of water the weighted coacting valves will be lifted just enough to open the ports f and g sufficiently to allow that amount of water to pass through the said ports under the pressure caused by the weight of the valve, and the valves will therefore always stand in the same position when the meter is delivering the same quantity of water. It is this action of the valves in always assuming the same position when the same quantity of water is passing which enables them to exert the regulating effect upon the two streams for every rate of flow, and which makes the registration of the device reliable.

Now, in order to control the proportional quantity of water which shall flow in the two streams for any given rate of flow, it is necessary that the areas of the port-openings of the coacting valves should bear a definite proportion to each other, and this ratio of the valve-port openings cannot be determined by calculation, since it will vary with every different construction of measuring device and connecting-passages. Therefore the proportional size of the port-openings f is determined by actual test. If the delivery of the meter increases the valve will rise higher and a new proportional relation between the areas of the port-openings will be determined for the new position of the valve, and this will be done for every rate of flow. When the valve-ports are formed in a cylinder of uniform diameter, as shown in Figs. 5, 6, 7, and 8, the bearing-seat extends down to the lower valve-ports, and the water enters the cylinder at its lower open end, and the ports are formed and their area determined the same as in the valve of two diameters.

The upper valve-ports may be formed in the walls of the bearing-cylinder e by extending said bearing upward into the passage E, in which case the valve-head will control the ports. The lower valve-ports may be of irregular outline; but I prefer to regulate the device by adjusting only one set of ports, as described.

The outlet-chamber E is formed by the case-cover G, upon which the box j, containing the register-operating parts, is seated, and the cover has a projection, H, just over the flow-controlling coacting valves to limit their lift. The inflow is divided by the coacting valves, the main portion passing up through the top ports into the chamber E, over the piston-cylinder to the outlet F, while the other division passes down through the bottom ports into the chamber d, under the piston-cylinder, into and through the piston, into and out with the main stream in the top chamber, as shown by the arrows.

When the coacting valves are in their lowest position, they are supported upon the bottom of the case, with all the ports closed by sinking, like a plunger, so as to bring the top edges of said ports below the top edges of the bearing-seats. The upper closed end of the valve is constantly exposed to the lifting-pressure of the water in the inlet-passage between the two sets of valve-ports, so that such pressure must first lift the valve to bring the upper edges of both sets of its wall-ports in communication with their respective passages, d E. In this movement both sets of ports have the same plunger action and are controlled by the separate bearings e e' of the case which separate the passages d and E from the inlet.

The principle of varying the proportional areas of the discharge-orifices of a water-meter in which the influent volume is divided into two streams—one of which is measured to determine the measurement of both in connection with the manner of determining such results—is set forth in application for Letters Patent filed by me September 4, 1885, under Serial Nos. 176,159 and 176,160, and in pursuance whereof Letters Patent Nos. 336,138 and 336,139 were issued under date of February 16, 1886, and November 30, 1885, Serial Nos. 184,329 and 184,330, and in pursuance whereof Letters Patent were issued under the same date, and numbered 336,145 and 336,146, and such matter is not broadly claimed herein, as my improvement is limited to coacting plunger-valves of the construction and form herein described, having provision for effecting the variation of the proportional areas of the discharge-orifices, as stated.

I claim—

1. The combination, with a water-meter having the influent volume divided into two separate streams, one of which is measured, of hollow coacting connected plunger-valves effecting the division of the flowing volume, and having ports for controlling the flow of each stream, formed and adapted to vary the proportional area of the discharge-openings for every rate of flow, substantially as described, for the purpose specified.

2. The combination, with a proportional water-meter, of a hollow plunger-valve of two diameters, each having ports, the valve-port of greatest diameter controlling the flow through the main passage and the valve-port of least diameter controlling the flow through the metered passage, one valve-port formed of irregular outline, whereby to vary the proportional area of the discharge-orifices, substantially as described, for the purpose specified.

3. The combination, with a water-meter having the inflow divided into two streams, one of which is measured, of a hollow plunger of two coacting valves having a weight, and having two sets of ports formed and adapted to vary the proportional area of the discharge-orifices for every rate of flow, substantially as described, for the purpose specified.

4. The combination, with a proportional water-meter, of a weighted plunger-valve composed of two hollow coaxial cylinder parts, each open at its lower end, the upper cylinder part having seat-bearings and ports of irregular outline controlling the main discharge-orifices and the lower cylinder part having seat-bearings and ports of regular form controlling the metered passage, substantially as described, for the purpose specified.

5. The combination, with the meter-case having the flow-passages C d E and the meter-operating device, of the weighted plunger-valve having two hollow cylindrical parts of unequal diameters, one having a cylindrical seat, e, opening into the passage E, and the other having a cylindrical seat, e', opening into the passage d, and both valve parts having ports opening into the passage C, substantially as described, for the purpose specified.

6. In meters of the class herein stated, the automatic acting plunger-valve having a set of ports at each end, and the valve-seats, in combination with the main outlet, which is governed by one set of said ports, and the passage to the measuring-chamber, which is governed by the second set of ports, one set of said ports being of irregular outline, substantially as described, for the purpose specified.

7. In combination with the vertically-acting valve of two cylindrical hollow parts, each having an independent set of ports, one set of which is of irregular form, a water-meter having two passages which are controlled, respectively, by said independent ports, substantially as described, for the purpose specified.

In testimony whereof I have hereunto set my hand in the presence of two subscribing witnesses.

LEWIS HALLOCK NASH.

Witnesses:
A. E. H. JOHNSON,
J. W. HAMILTON JOHNSON.